(12) United States Patent
Yao

(10) Patent No.: US 7,898,974 B2
(45) Date of Patent: Mar. 1, 2011

(54) METHOD FOR OBTAINING QOS INFORMATION OF A SESSION

(75) Inventor: Xin Yao, Shenzhen (CN)

(73) Assignee: Huawei Technologies Co., Shenzhen (CN)

( * ) Notice: Subject to any disclaimer, the term of this patent is extended or adjusted under 35 U.S.C. 154(b) by 360 days.

(21) Appl. No.: 11/945,051

(22) Filed: Nov. 26, 2007

(65) Prior Publication Data

US 2008/0095060 A1 Apr. 24, 2008

Related U.S. Application Data

(63) Continuation of application No. PCT/CN2006/001115, filed on May 26, 2006.

(30) Foreign Application Priority Data

May 28, 2005 (CN) .......................... 2005 1 0074559

(51) Int. Cl.
  *G06F 11/00* (2006.01)
  *H04L 1/00* (2006.01)
  *H04L 12/26* (2006.01)

(52) U.S. Cl. .......................... 370/252; 370/236; 370/241

(58) Field of Classification Search .................. 370/229, 370/231, 232, 233, 234, 235, 236, 236.1, 370/236.2, 241, 395.2, 392.21, 39.215
See application file for complete search history.

(56) References Cited

U.S. PATENT DOCUMENTS

| 6,108,782 | A | * | 8/2000 | Fletcher et al. ............... 713/153 |
| 6,678,250 | B1 | * | 1/2004 | Grabelsky et al. ............ 370/241 |
| 7,430,179 | B2 | * | 9/2008 | Towns-von Stauber et al. ............................. 370/252 |
| 7,542,461 | B2 | * | 6/2009 | Oran ............................. 370/352 |
| 7,729,268 | B2 | * | 6/2010 | Matta et al. .................... 370/252 |
| 7,764,679 | B2 | * | 7/2010 | MeLampy et al. ............ 370/389 |

(Continued)

FOREIGN PATENT DOCUMENTS

CN 1375966 A 10/2002

(Continued)

OTHER PUBLICATIONS

First Chinese Office Action dated (mailed) Oct. 19, 2007, issued in related Chinese Application No. 200510074559.X, Huawei Technologies Co., Ltd.

(Continued)

*Primary Examiner* — Warner Wong
(74) *Attorney, Agent, or Firm* — Finnegan, Henderson, Farabow, Garrett & Dunner LLP

(57) ABSTRACT

The present invention relates to a method for obtaining Quality of Service (QoS) information of a session. The present invention may obtain QoS information of a session by analyzing a control message of the session on a Media Proxy (MP). The present invention may also make a QoS analysis only on the session which needs the QoS analysis, according to configured policy information, and returns the corresponding QoS analysis result to a Signaling Proxy (SP) or another particular server. Moreover, for the session on which the QoS analysis needs to be made, it may be configured that the QoS analysis is to be made on only parts of the control messages. Therefore, the implementation of the present invention may not only save processing resources of the MP but also increase the efficiency of the QoS analysis for the session during the QoS analyzing and processing procedure.

12 Claims, 2 Drawing Sheets

U.S. PATENT DOCUMENTS

| | | |
|---|---|---|
| 2002/0136162 A1 | 9/2002 | Yoshimura et al. |
| 2003/0120773 A1* | 6/2003 | Mueller et al. ................ 709/224 |
| 2004/0057436 A1* | 3/2004 | Couturier et al. ........ 370/395.21 |
| 2007/0008894 A1* | 1/2007 | Lynch et al. .................. 370/244 |
| 2007/0206617 A1* | 9/2007 | Andreasen et al. ........... 370/401 |

FOREIGN PATENT DOCUMENTS

| | | |
|---|---|---|
| CN | 1490959 A | 4/2004 |
| WO | WO-02/078261 A1 | 10/2002 |
| WO | WO-03/085887 A1 | 10/2003 |

OTHER PUBLICATIONS

Rejection of Chinese Application No. 200510074559.X dated (mailed) Jun. 19, 2009, issued in related Chinese Application No. 200510074559.X, Huawei Technologies Co., Ltd.

Notification of Reexamination of Chinese Application No. 200510074559.X dated (mailed) Apr. 22; 2010, issued in related Chinese Application No. 200510074559.X, Huawei Technologies Co., Ltd.

* cited by examiner

METHOD FOR OBTAINING QOS INFORMATION OF A SESSION

CROSS-REFERENCES TO RELATED APPLICATIONS

The present application is a continuation of PCT Application No. PCT/CN2006/001115, filed on May 26, 2006, which claims a priority to Chinese Patent Application No. 200510074559.X, filed on May 28, 2005. All of these applications are incorporated herein by reference for all purposes.

FIELD OF THE INVENTION

The present invention relates to the field of network communication technologies, and more particularly, to a method for obtaining Quality of Service (QoS) information of a session.

BACKGROUND OF THE INVENTION

As the rapid development of communication technologies, a variety of network technologies emerge increasingly. The packet switching-based Next Generation Network (NGN) is becoming more and more popular among others. An NGN is a synthetic and fully-opened broad-frequency network platform architecture which may provide multiple services such as voice, data and multimedia simultaneously, and may implement at least Gigabit Fiber to the Home (FTTH). Moreover, the NGN may be used to introduce the low-price Internet Protocol (IP) telephony being used for long distance calls into local telephony, so as to decrease the cost and price of local calls greatly.

At present, the NGN includes a Signaling Proxy (SP) and a Media Proxy (MP) as shown in FIG. 1. Corresponding services may be provided in the NGN on the basis of the signaling proxy and the media proxy. The functionality of the signaling proxy and the media proxy is described as follows in detail.

For an NGN subscriber (designated as TE), the SP may be considered as a soft switching system. Registration and calling messages of the subscriber will be sent to the SP firstly, and be forwarded to a core soft switching system after suffering a signaling processing by the SP. For the core soft switching system, the SP may be considered as a subscriber. The soft switching system sends a request for calling a called subscriber to the SP, and then the SP forwards the request to the called subscriber after performing a signaling processing on the request. Generally the SP needs to support proxy functions for one or more of Session Initiation Protocol (SIP), H.323, Media Gateway Control Protocol (MGCP) and H.248.

The MP provides a proxy service for media flows. The media flows communicated between the subscriber and the outside are processed and forwarded through the MP. The media flow generally refers to a Real-time Transport Protocol (RTP) flow or a Real-time Transport Control Protocol (RTCP) flow.

In the NGN, a session table for the media flow processing is dynamically created/deleted on/from the MP by an SP instruction. The SP and the MP may communicate with each other via Common Open Policy Service (COPS) or a policy protocol in broad sense.

A relationship between the SP and the MP is described as follows in detail so that the NGN may be further understood.

Both the SP and the MP are a logical conception. One SP may communicate with one or more MPs. The SP and the MP may be integrated into one apparatus. The SP and the MP may also be implemented with independent apparatuses or integrated with other apparatuses respectively.

For the purpose of evaluating the capability of an NGN, in certain conditions it is required to obtain some attributes of the QoS of a session in the NGN such as Jitter and Delay.

However, there is no specialized method for obtaining QoS information of a session until now.

SUMMARY OF THE INVENTION

The present invention is to provide a method for obtaining QoS information of a session. The method may analyze the QoS of a particular session, so as to increase efficiency of QoS analysis and save resources of network entities.

A method, provided by the present invention, for obtaining QoS information of a session includes:

configuring policy information used for analyzing QoS of a session;

extracting a control message of the session during the session; and obtaining QoS information of the session from information carried in the control message according to the policy information used for analyzing the QoS of the session.

The control message includes a Real-time Transport Control Protocol (RTCP) message.

The policy information is configured on a Signaling Proxy (SP), a Media Proxy (MP), an intermediate server or a separately-arranged policy server.

If the policy information is configured on the SP, the SP determines whether it is necessary to make a QoS analysis on the established session according to the configured policy information, and when determining that it is necessary to make a QoS analysis on the session, the SP sends an instruction to the MP to instruct the MP to make a QoS analysis on the session.

If the policy information is configured on the intermediate server or the separately-arranged policy server, when the session is established, the SP sends a message to the intermediate server or the policy server to request the intermediate server or the policy server to determine whether it is necessary to make a QoS analysis on the session; the intermediate server or the policy server determines that it is necessary to make a QoS analysis on the session according to the configured policy information and returns a notification to the SP; or the intermediate server initiatively sends a notification, which is determined according to the policy information, indicating that it is necessary to make a QoS analysis on the session to the MP;

the SP sends the notification indicting it is necessary to make a QoS analysis on the session to the MP; or the intermediate server or the policy server determines that it is necessary to make a QoS analysis on the session according to the configured policy information and returns a notification to the MP directly.

If the policy information is configured on the policy server, the SP obtains information indicating that it is necessary to make a QoS analysis on the session by communicating with the policy server through the intermediate server; the SP sends an notification indicating that it is necessary to make a QoS analysis on the session to the MP; or the MP directly obtains the information indicating that it is necessary to make a QoS analysis on the session by communicating with the policy server through the intermediate server.

The notification indicating that it is necessary to make a QoS analysis on the session carries identification information of the session on which the QoS analysis needs to be made.

The method further includes:

determining, by the MP, whether the control message of the session is a control message on which a QoS analysis needs to be made upon receipt of the control message;

extracting the QoS information in the control message, modifying the control message and forwarding the modified control message if the control message is a control message on which a QoS analysis needs to be made; and directly modifying the control message and forwarding the control message if the control message is not a control message on which a QoS analysis needs to be made.

The control message includes a Real-time Transport Control Protocol (RTCP) message.

The determining whether the control message is a control message on which a QoS analysis needs to be made includes:

determining, by the MP, whether the control message of the session is a control message on which a QoS analysis needs to be made according to identification information of the session in the received control message.

A control message complying with a configured condition is determined from control messages on which a QoS analysis needs to be made, and a QoS analysis is made on the determined control message.

The configure condition includes a configured time condition or a configured condition on the amount of the received messages.

The extracting the QoS information in the control message includes:

obtaining QoS information of a group of control messages;

taking an average value of the QoS information of the group of control messages as a QoS analysis result of the session, or obtaining the maximum value or minimum value of the group of control messages and taking the maximum value or minimum value as the QoS analysis result of the session.

The method further includes: sending the obtained corresponding QoS information to the SP or a particular server.

The method further includes: carrying the QoS information in an existing message exchanged between the MP with the SP or the particular server or in a newly-specified message, to send the QoS information to the SP or the particular server.

From the above solutions of the present invention, it may be seen that the present invention allows analyzing the service quality of a session in communication apparatuses and obtaining corresponding QoS information; the present invention also allows making QoS analysis on a particular session on the MP and obtaining a corresponding analysis result. Therefore, the present invention may not only obtain the QoS information of a session but also make a QoS analysis on parts of sessions, thereby saving the processing resources of the MP and increasing the efficiency of QoS analyzing and processing by the MP.

DETAILED DESCRIPTION OF THE EMBODIMENTS

The present invention is to obtain attribute information of the QoS of a session. The QoS attributes of a session are generally carried in a control message such as an RTCP message. In an RTP/RTCP-based session, RTP and RTCP messages are both delivered through an MP being as a proxy, and the MP has the ability to analyze the RTCP protocol.

It is well known that the RTP message is used to transfer media flows, and there may be tens of RTP messages or more per second. However, there is only one RTCP message per tens of seconds in general. The limited number of RTCP messages makes it possible to analyze the RTCP messages and obtain the QoS attributes in the RTCP messages.

It is known from the previous discussion that the MP is capable of analyzing the QoS attributes of a session. The MP needs to send the obtained QoS attributes to the SP or a particular server after analyzing the obtained QoS attributes.

Implementation of the present invention is described as follows.

The control message such as an RTCP message is extracted by the MP. Information carried in the control message is then obtained by the MP so as to obtain QoS information of the session. The QoS information which may be obtained from the RTCP message includes delay, packet loss, delay jitter and the like (The specific structure of the RTP/RTCP message may be learned by reference to RFC 3550 RTP: A Transport Protocol for Real-Time Application or its newer version). The QoS information obtained by the MP may be reported to the SP or a particular server.

In analyzing the corresponding QoS attributes, in some cases, the MP has not to analyze the QoS of all sessions. Accordingly, the present invention may make QoS analysis on the sessions on which the QoS analysis needs to be made, according to configured policy information. Additionally, it may be configured for the sessions on which the QoS analysis needs to be made that the QoS analysis are made on only parts of control messages, thereby avoiding a QoS analyzing and processing to be made on all sessions and thus increasing the efficiency of the QoS analysis for the sessions effectively.

To make the present invention understood more easily, the present invention will be described hereunder in detail with reference to the accompanying drawings.

Figure 1:
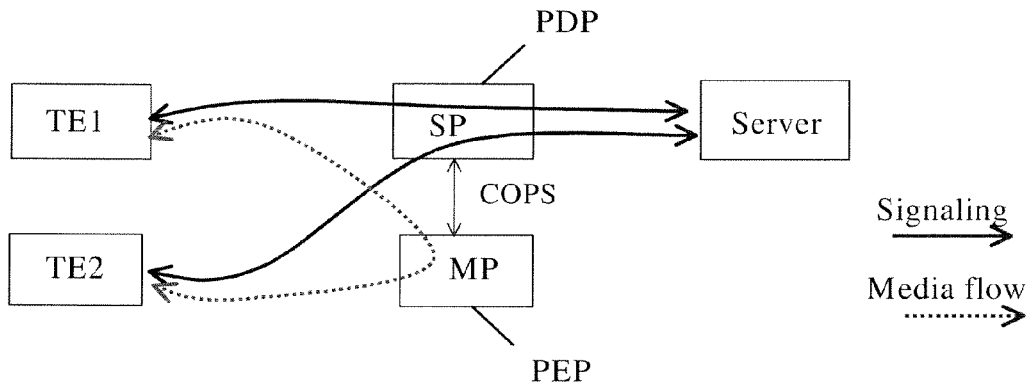
FIG. 1 is a schematic diagram illustrating the structure of an NGN.
Figure 2:
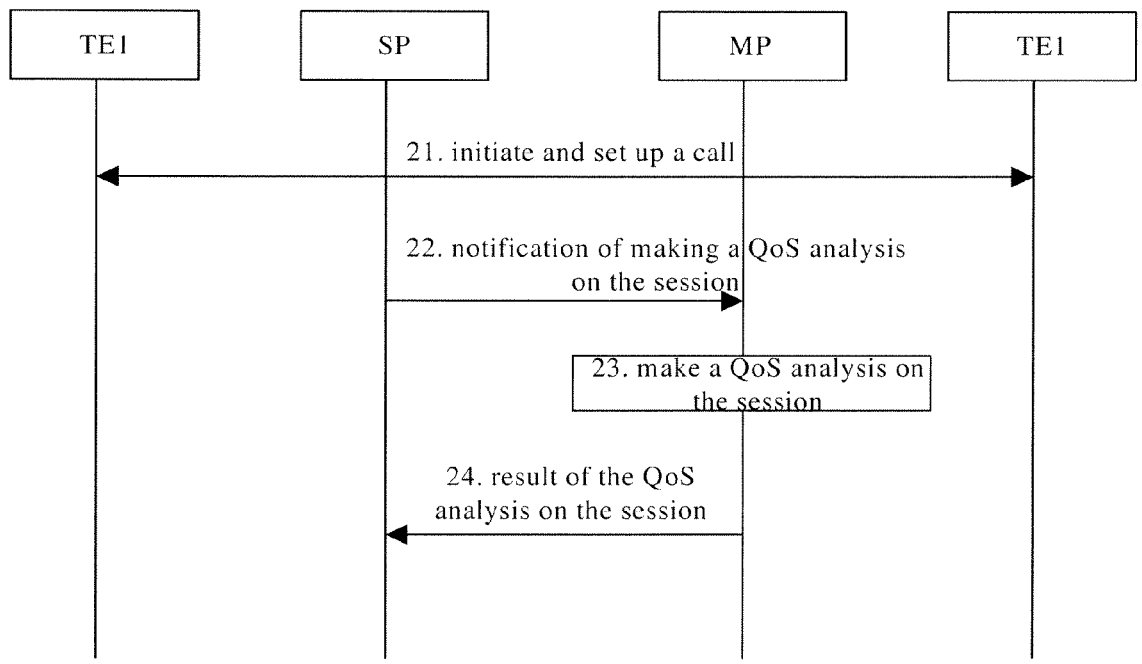
FIG. 2 is a flow chart illustrating a method of the present invention.

FIG. 2 shows implementation of the method provided in the present invention. The procedure shown in FIG. 2 is a common procedure from the initiation of a call to the termination of the call. This procedure is independent of specific protocols and is a common call processing procedure. The procedure shown in FIG. 2 includes the following processes.

In process 21, a terminal TE1 initiates a call to another terminal TE2, the TE1 and TE2 communicate information to each other to set up the call.

In process 22, when the call is set up, the SP instructs the MP to create a corresponding media flow processing table entry.

In process 23, the MP makes QoS analysis on the session.

In other words, the MP analyzes the QoS of the session as required during the call.

In process 24, the MP sends a QoS analysis result for the session to the SP or to a specified server, such that the SP or the server may obtain the QoS analysis result of the session that it needs.

Specifically, the SP may instruct the MP to delete the corresponding media flow processing table entry and the MP sends the QoS analysis result to the SP, when the call is terminated.

The MP may also send a current QoS analysis result to the SP during the call.

Moreover, the QoS analysis result for the session may be integrated into a message to be exchanged between the MP and the SP or between the MP and the specified server, so as to be transferred to the SP or the specified server.

In FIG. 2, the processes 22, 23 and 24 are three critical processes, implementation of which will be described hereunder in detail.

The process 22, in which the SP instructs the MP to prepare to start the QoS analysis, will be described with reference to FIG. 3. The process 22 includes the following processes.

In process 31, the SP sends a message to a policy server, to request the policy server to determine whether it is necessary to make a QoS analysis on the session.

The policy server is used to save the configured control policy information on whether it is necessary to make a QoS analysis on a session.

In process 32, upon receipt of the message from the SP, if the policy server determines that it is necessary to make a QoS analysis on the session, it returns to the SP a message indicating that it is necessary to make a QoS analysis on the session.

In process 33, when it is determined by the policy server that it is necessary to make a QoS analysis on the session, the SP instructs the MP to start the QoS analysis with an instruction message containing identification information of the session. The MP may learn the session on which the QoS analysis is to be made from the identification information. In general, the identification information may be identified by source/destination IP address and port number of a media flow of a particular session.

If the policy server does not return the message indicating that it is necessary to make a QoS analysis on the session, the SP will not instruct the MP to make a QoS analysis.

Figure 3:
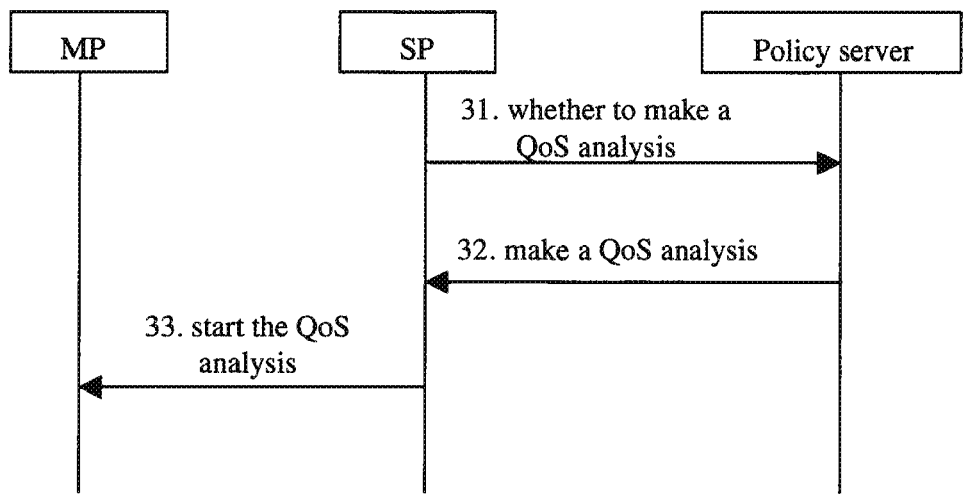
FIG. 3 is a flow chart illustrating implementation of process 22 shown in FIG. 2.

In FIG. 3, the SP may also communicate with the policy server through an intermediate server (e.g., a server to which the SP provides a proxy service), instead of communicating with the policy server directly. The intermediate server may send the corresponding determination result to the SP. In the detail implementation, the SP sends a request to the intermediate server when a session is set up, to request the determination of whether to make a QoS analysis on the session; the intermediate server communicates with the policy server for a corresponding determination result; then the intermediate server returns the determination result to the SP. This procedure may also be implemented as: the intermediate server communicates directly with the policy server when the session is set up, for determining whether it is necessary to make a QoS analysis on the session; and the intermediate server returns initiatively the determination result to the SP.

In FIG. 3, the policy information saved on the policy server may also be configured directly on the SP. In this case, the SP may determine whether it is necessary to make a QoS analysis on the session without communicating with a specific policy server.

Alternatively, the policy information may be configured on the intermediate server and the determining result may be returned to the SP by the intermediate server. In the detailed implementation, the intermediate server sends the determining result to the SP initiatively when the session is set up; or the intermediate server returns the determination result to the SP in response to a request from the SP when the session is set up.

Alternatively, the policies may be configured directly on the MP, and the QoS analysis may be made on the corresponding session directly by the MP. In this case, the configured policies are generally simple, for example, making or not making a QoS analysis on all sessions. Moreover, if the policies are configured directly on the MP, the process 22 in FIG. 2 may be omitted and the process 23 may be executed directly according to the policies.

Figure 4:
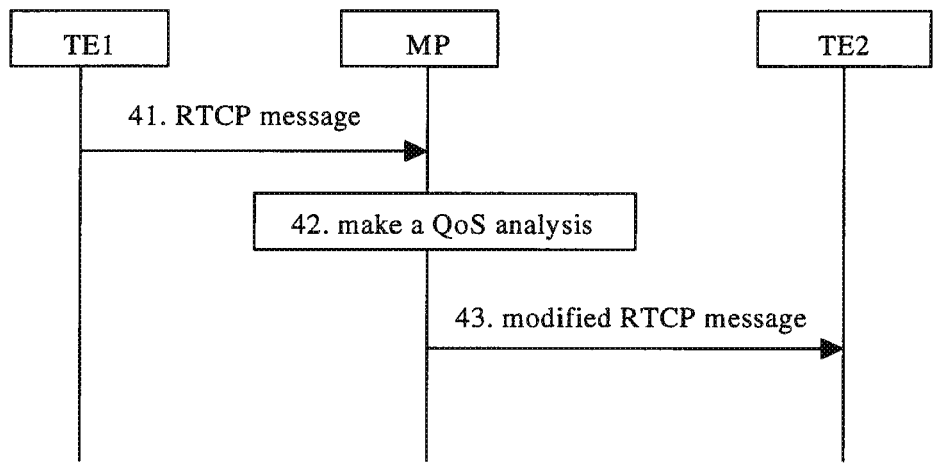
FIG. 4 is a flow chart illustrating implementation of process 23 shown in FIG. 2.

The process 23 of FIG. 2, in which the MP makes a QoS analysis on the session, will be described in detail. As shown in FIG. 4, the process 23 includes the following processes.

In process 41, the MP receives an RTCP message from a user terminal TE1.

In process 42, the MP analyzes the RTCP message to determine whether it is necessary to make a QoS analysis on the RTCP message. If it is necessary to make a QoS analysis, the MP extracts corresponding QoS information from the RTCP message and save the information.

Whether it is necessary to make a QoS analysis on the RTCP message may be determined according to session identification information contained in the RTCP message and the identification information of the session on which a QoS analysis needs to be made received by the MP. For an instance, to determine whether it is necessary to make a QoS analysis on the RTCP message according to the source/destination number port, if the source/destination port number contained in the RTCP message accords with the source/destination port number of the session on which the QoS analysis is to be made, it is determined that a QoS analysis needs to be made on the RTCP message.

In this process, the QoS analysis is made according to the configured policies as follows but is not made on all RTCP messages.

(1) The QoS analysis is made according to time. For an instance, if the QoS analysis is made once a minute and an RTCP message is sent per 20 seconds, in one minute, the MP needs to analyze only one RTCP message, thereby decreasing the MP's load.

(2) The QoS analysis is made according to the number of messages. Specifically, the QoS analysis is made after a certain amount of RTCP messages are received. For an instance, the QoS analysis is made once per 5 RTCP messages. Therefore, the load of the MP may also be decreased.

In process 43, the MP modifies the RTCP message and sends the modified RTCP message to the opposite TE2.

In other words, the MP makes a normal modification on the RTCP message and then forwards the modified RTCP message.

In the present invention, since the QoS information carried in various RTCP messages are different, the MP may perform a corresponding algorithm process on the QoS information and takes the processing result as the QoS analysis result for the session. For an instance, the MP may make an averaging process on the multiple pieces of information and records the maximum value and the minimum value among the information as the result of the corresponding QoS analysis. Alternatively, the MP may record the average value of the QoS information as the QoS analysis result without recording the peak value or the valley value.

In the present invention, the MP may also record the corresponding RTCP messages and make a collective analysis when the session is terminated, so as to obtain a desired QoS analysis result.

The process 24 of FIG. 2, in which the MP sends the QoS information to the SP, will be described in detail according to an embodiment of the present invention.

Figure 5:
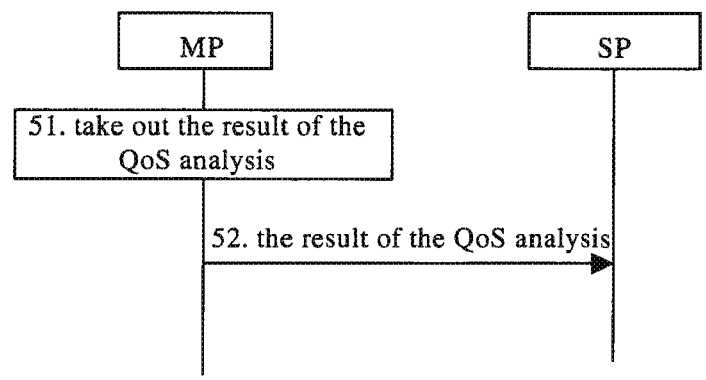
FIG. 5 is a flow chart illustrating implementation of process 24 shown in FIG. 2.

The process 24 includes the following processes as shown in FIG. 5.

In process 51, when it is determined that the session on which a QoS analysis needs to be made is terminated, the MP takes out the QoS information of the session obtained by analyzing.

According the processes as described above, the QoS information may be sent to the SP or a particular corresponding server during the session by executing process 52.

In process 52, the MP sends the QoS information to the SP or a particular server.

In other words, it may be configured to send the QoS information obtained by the MP to the SP or to a particular server receiving those QoS information as required.

Although the present invention has been illustrated and described with reference to the above preferred embodiments, the scope of the present invention is not limited to those embodiments. Various variations and modifications conceivable to those skilled in the art in view of the disclosure of the present invention should fall into the spirit and scope of the present invention as defined by the accompanying claims.

The invention claimed is:

1. A method for obtaining Quality of Service (QoS) information of a session, comprising:
   configuring a policy for analyzing QoS of a session;
   extracting a control message of the session during the session;
   obtaining QoS information of the session from information carried in the control message according to the policy for analyzing the QoS of the session,
   wherein the policy is configured on a Signaling Proxy (SP), a Media Proxy (MP), an intermediate server, or a separately-arranged policy server,
   wherein if the policy is configured on the intermediate server or the separately-arranged policy server,
   when a session is established:
      the SP sends a message to the intermediate server or the policy server to request the intermediate server or the policy server to determine whether it is necessary to make a QoS analysis on the session; the intermediate server or the policy server determines that it is necessary to make a QoS analysis on the session according to the configured policy information and returns a notification to the SP; or the intermediate server sends a notification, which is determined according to the policy, indicating that it is necessary to make a QoS analysis on the session to the MP;
      the SP sends the notification indicting it is necessary to make a QoS analysis on the session to the MP; or the intermediate server or the policy server determines that it is necessary to make a QoS analysis on the session according to the configured policy information and returns the notification to the MP directly.

2. The method according to claim 1, wherein the control message comprises a Real-time Transport Control Protocol (RTCP) message.

3. The method according to claim 1, wherein if the policy is configured on the SP, the SP determines whether it is necessary to make a QoS analysis on the established session according to the configured policy information, and if it is determined that it is necessary to make a QoS analysis on the session, the SP sends an instruction to the MP to instruct the MP to make a QoS analysis on the session.

4. The method according to claim 1, further comprising:
   determining, by the MP, whether the control message of the session is a control message on which a QoS analysis needs to be made upon receipt of the control message;
   if it is determined that the control message is a control message on which a QoS analysis needs to be made, extracting the QoS information in the control message, modifying the control message and forwarding the modified control message.

5. The method according to claim 4, wherein the control message comprises a Real-time Transport Control Protocol (RTCP) message.

6. The method according to claim 4, wherein the determining whether the control message is a control message on which a QoS analysis needs to be made comprises:
   determining, by the MP, whether the control message of the session is a control message on which a QoS analysis needs to be made according to identification information of the session in the received control message.

7. The method according to claim 4, wherein a control message complying with a configured condition is determined from control messages on which a QoS analysis needs to be made, and a QoS analysis is made on the determined control message.

8. The method according to claim 7, wherein the configure condition comprises a configured time condition or a configured condition on the amount of the received messages.

9. The method according to claim 4, wherein extracting the QoS information in the control message comprises:
   obtaining QoS information of a group of control messages;
   taking an average value of the QoS information of the group of control messages as a QoS analysis result of the session, or obtaining the maximum value or minimum value of the group of control messages and taking the maximum value or minimum value as the QoS analysis result of the session.

10. The method according to claim 1, further comprising:
    sending the obtained corresponding QoS information to the SP or a particular server.

11. The method according to claim 10, further comprising:
    sending the QoS information to the SP or the particular server.

12. A method for obtaining Quality of Service (QoS) information of a session, comprising:
    configuring a policy used for analyzing QoS of a session;
    extracting a control message of the session during the session;
    obtaining QoS information of the session from information carried in the control message according to the policy used for analyzing the QoS of the session;
    wherein the policy is configured on a Signaling Proxy (SP), a Media Proxy (MP), an intermediate server, or a separately-arranged policy server,
    wherein if the policy is configured on the policy server:
       the SP obtains information indicating that it is necessary to make a QoS analysis on the session by communicating with the policy server through the intermediate server, the SP sends a notification indicating that it is necessary to make a QoS analysis on the session to the MP, or
       the MP directly obtains the information indicating that it is necessary to make a QoS analysis on the session by communicating with the policy server through the intermediate server.

* * * * *